United States Patent
Agrawal et al.

(10) Patent No.: US 9,634,973 B2
(45) Date of Patent: Apr. 25, 2017

(54) METHOD AND APPARATUS FOR MANAGING BLIND-CARBON-COPY ACCOUNT REPLIES IN E-MAIL COMMUNICATIONS

(71) Applicant: Google Technology Holdings LLC, Mountain View, CA (US)

(72) Inventors: Amit Kumar Agrawal, Bangalore (IN); Lawrence A Willis, McHenry, IL (US); Jayashree M Yabannavar, Bangalore (IN)

(73) Assignee: Google Technology Holdings LLC, Mountain View, CA (US)

( * ) Notice: Subject to any disclaimer, the term of this patent is extended or adjusted under 35 U.S.C. 154(b) by 381 days.

(21) Appl. No.: 14/464,800

(22) Filed: Aug. 21, 2014

(65) Prior Publication Data
US 2016/0057089 A1    Feb. 25, 2016

(51) Int. Cl.
*G06F 15/16*    (2006.01)
*H04L 12/58*    (2006.01)

(52) U.S. Cl.
CPC ............. *H04L 51/16* (2013.01); *H04L 51/24* (2013.01)

(58) Field of Classification Search
CPC ..... G06Q 10/107; H04L 51/16; H04L 12/586; H04L 12/589; G06F 17/30386; G06F 17/30554
See application file for complete search history.

(56) References Cited

U.S. PATENT DOCUMENTS

| | | |
|---|---|---|
| 7,512,788 B2 | 3/2009 | Choi et al. |
| 8,219,623 B2 | 7/2012 | Tribble et al. |
| 8,392,514 B2 | 3/2013 | Emami |
| 8,478,981 B2 | 7/2013 | Khan et al. |
| 2007/0005706 A1 | 1/2007 | Branda et al. |
| 2007/0124392 A1 | 5/2007 | Goldberg |

(Continued)

OTHER PUBLICATIONS

Itzy Sabo, "Reply-to-All Exposes Blind Co-Conspirators", Email Overloaded, http://itzy.wordpress.com/2006/06/01/reply-to-all-exposes-blind-co-conspirators/, Jun. 1, 2006, 11 pages.

(Continued)

*Primary Examiner* — Peling Shaw
(74) *Attorney, Agent, or Firm* — Troutman Sanders LLP; James E. Schutz; Brennan M. Carmody

(57) ABSTRACT

A apparatus and method for managing blind-carbon-copy replies in e-mail communications includes an electronic computing device configured to detect 602 that an e-mail account that is a blind-carbon-copy recipient of a received e-mail of an e-mail thread is sending a reply e-mail to at least one participant of a set of participants of the e-mail thread. The electronic computing device is also configured to determine 604, from the set of participants of the e-mail thread, an e-mail account adder that added the e-mail account to the e-mail thread as the blind-carbon-copy recipient. The electronic computing device is further configured to add 610 text to the reply e-mail indicating the e-mail account adder forwarded the received e-mail to the e-mail account or to send 614 an auto-generated e-mail notification to the at least one participant of the e-mail thread indicating the e-mail account adder added the e-mail account to the e-mail thread as a participant.

20 Claims, 13 Drawing Sheets

(56) References Cited

U.S. PATENT DOCUMENTS

| | | | |
|---|---|---|---|
| 2009/0138559 A1* | 5/2009 | Jones | G06Q 10/00 |
| | | | 709/206 |
| 2010/0070592 A1* | 3/2010 | Steuer | H04L 12/58 |
| | | | 709/206 |
| 2011/0225245 A1 | 9/2011 | Bhogal et al. | |
| 2012/0079041 A1* | 3/2012 | Vuong | G06Q 10/107 |
| | | | 709/206 |
| 2013/0290435 A1 | 10/2013 | Martin et al. | |
| 2014/0310365 A1* | 10/2014 | Sample | H04L 51/16 |
| | | | 709/206 |
| 2015/0032827 A1* | 1/2015 | Tyler | H04L 51/16 |
| | | | 709/206 |

OTHER PUBLICATIONS

Msoutlook.Info, "Reply/Reply to All with Original Attachments", http://www.msoutlook.info/question/564, May 7, 2014, 3 pages.

Google, "Forward Messages", https://support.google.com/mail/answer/6586?hl=en, May 7, 2014, 2 pages.

The Internet Engineering Task Force (IETF) Network Working Group, "Internet Message Format", RFC 5322, http://www.ietf.org/rfc/rfc5322.txt, Section 3.6.3 Destination Address Fields, Oct. 2008, 57 pages.

The Internet Engineering Task Force (IETF) Network Working Group, "Sieve: An Email Filtering Language", RFC 5228, http://www.ietf.org/rfc/rfc5228.txt, Jan. 2008, 42 pages.

* cited by examiner

SENT: MON 2/24/2014 9:32 AM
FROM: BOB
TO: FRANK; TERESA; FAYE
CC: SALLY
SUBJ: RE: CROSSFIRE DRIVER ASSEMBLY UPDATE

HI TERESA,

BASED ON MARKET ANALYSIS, DEMAND FOR HEADPHONES SPIKES IN MAY AS CONSUMERS SPEND AN INCREASING AMOUNT OF TIME OUTDOORS. IN THE PAST, WE HAVE SEEN OUR COMPETITORS INTRODUCING NEW MODELS IN EARLY MAY OR EVEN LATE APRIL. TO MAINTAIN OUR MARKET SHARE, WE MUST MEET OR BEAT OUR PRODUCT RELEASE DATE OF MAY 5TH. ACCORDINGLY, PLEASE INDICATE WHAT ADDITIONAL RESOURCES YOU WILL NEED TO HAVE A DRIVER ASSEMBLY READY FOR TESTING BY MARCH 10.

THANKS,

BOB.

---

ON MON, FEB 24, 2014 AT 9:18 AM <FRANK> FWD TO <BOB>

FYI

...

---

ON MON, FEB 24, 2014 AT 9:07 AM, <TERESA> WROTE:

HI FRANK,

WITH THE NEW VARIABLE-THICKNESS MEMBRANES, WE'VE HAD TO CHANGE THE GEOMETRY OF OUR FLAT-WOUND VOICE-COILS TO ACHIEVE THE 114 DB SPL/V SENSITIVITY SPECIFIED FOR THIS PROJECT. IT MIGHT TAKE US A FEW EXTRA DAYS TO GET THE BUGS WORKED OUT.

BEST,

TERESA.

---

ON MON, FEB 24, 2014 AT 8:53 AM, <FRANK> WROTE:

HI TERESA,

WITH TWO WEEKS LEFT UNTIL OUR FIRST SCHEDULED AUDIO TEST OF THE PROTOTYPE CROSSFIRE UNIT, I WANTED TO GET A PROGRESS REPORT ON THE DRIVER ASSEMBLY FROM YOUR DEPARTMENT.

THANKS,

FRANK.

*FIG. 4*

SENT: MON 2/24/2014 9:32 AM
FROM: BOB
TO: FRANK; TERESA; FAYE
CC: SALLY
SUBJ: RE: CROSSFIRE DRIVER ASSEMBLY UPDATE

400

HI TERESA,

BASED ON MARKET ANALYSIS, DEMAND FOR HEADPHONES SPIKES IN MAY AS CONSUMERS SPEND AN INCREASING AMOUNT OF TIME OUTDOORS. IN THE PAST, WE HAVE SEEN OUR COMPETITORS INTRODUCING NEW MODELS IN EARLY MAY OR EVEN LATE APRIL. TO MAINTAIN OUR MARKET SHARE, WE MUST MEET OR BEAT OUR PRODUCT RELEASE DATE OF MAY 5TH. ACCORDINGLY, PLEASE INDICATE WHAT ADDITIONAL RESOURCES YOU WILL NEED TO HAVE A DRIVER ASSEMBLY READY FOR TESTING BY MARCH 10.

THANKS,

448

BOB.

---

ON MON, FEB 24, 2014 AT 9:18 AM <FRANK> ADDED <BOB>   546

+BOB

---

ON MON, FEB 24, 2014 AT 9:07 AM, <TERESA> WROTE:

HI FRANK,

WITH THE NEW VARIABLE-THICKNESS MEMBRANES, WE'VE HAD TO CHANGE THE GEOMETRY OF OUR FLAT-WOUND VOICE-COILS TO ACHIEVE THE 114 DB SPL/V SENSITIVITY SPECIFIED FOR THIS PROJECT. IT MIGHT TAKE US A FEW EXTRA DAYS TO GET THE BUGS WORKED OUT.

BEST,

444

TERESA.

---

ON MON, FEB 24, 2014 AT 8:53 AM, <FRANK> WROTE:

HI TERESA,

WITH TWO WEEKS LEFT UNTIL OUR FIRST SCHEDULED AUDIO TEST OF THE PROTOTYPE CROSSFIRE UNIT, I WANTED TO GET A PROGRESS REPORT ON THE DRIVER ASSEMBLY FROM YOUR DEPARTMENT.

THANKS,

442

FRANK.

| COMMUNICATION TRANSACTION ID | 573136 | —1152 |
|---|---|---|
| ORIGINATOR ADDRESS | TERESA | —1154 |
| MESSAGE SUBJECT | CROSSFIRE DRIVER ASSEMBLY UPDATE | —1156 |
| TO: LIST | FAYE; FRANK | —1158 |
| CC: LIST | SALLY | —1160 |
| BCC (ADDER): LIST | BOB (FRANK); BILL (TERESA) | —1162 |

| COMMUNICATION TRANSACTION ID | 573138 | —1252 |
|---|---|---|
| ORIGINATOR ADDRESS | FAYE | —1254 |
| MESSAGE SUBJECT | CROSSFIRE DRIVER ASSEMBLY UPDATE | —1256 |
| TO: LIST | TERESA; FRANK | —1258 |
| CC: LIST | SALLY | —1260 |
| BCC (ADDER): LIST | BOB (FRANK); BILL (TERESA; FAYE) | —1262 |

*FIG. 12*

METHOD AND APPARATUS FOR MANAGING BLIND-CARBON-COPY ACCOUNT REPLIES IN E-MAIL COMMUNICATIONS

FIELD OF THE DISCLOSURE

The present disclosure relates generally to managing e-mail communications and more particularly to a method and apparatus for adding a reply from a blind-carbon-copy e-mail account to an e-mail thread.

BACKGROUND

The advent and proliferation of electronic computing devices provides a way for people to communicate with one another that is unfettered from many of the restrictions that accompany conventional means of communication. With the touch of a button, a person can instantly deliver a written electronic communication to its intended recipient as an e-mail. There is no need to put pen to paper, no need to seal an envelope, and no need to pay postage. E-mail is versatile, offering greatly extended functionality over conventional mail, and convenient, being deliverable from virtually any place at any time. This makes e-mail especially well-suited for doing business. In the corporate realm, success often depends upon the speed at which information is communicated, and in some instances, the ability to archive and sort that information.

As with many technologies, functionality and convenience sometimes come at a price. For e-mail, a feature having a potential for negative repercussions is the ability to blind-carbon-copy an e-mail recipient. By adding an e-mail account to an e-mail thread as a blind-carbon-copy account, the owner of the blind-carbon-copy account has the ability to receive and read the e-mail communications of others participating in the thread without their knowledge. This is sometimes necessary. For example, it provides a supervisor with oversight. If the supervisor sends a reply to an email of the e-mail thread, however, he reveals himself as having been a blind-carbon-copy recipient on the e-mail. For the participants of the e-mail thread, this can offend their sense of privacy.

BRIEF DESCRIPTION OF THE FIGURES

The accompanying figures, where like reference numerals refer to identical or functionally similar elements throughout the separate views, form part of the specification and illustrate embodiments in accordance with the included claims.

FIG. 4 illustrates an e-mail thread to which a blind-carbon-copy e-mail account is added.

FIG. 5 illustrates an e-mail thread to which a blind-carbon-copy e-mail account is added.

FIG. 11 shows structured data records associated with an e-mail of an e-mail thread.

FIG. 12 shows structured data records associated with an e-mail of an e-mail thread.

Figure 1:
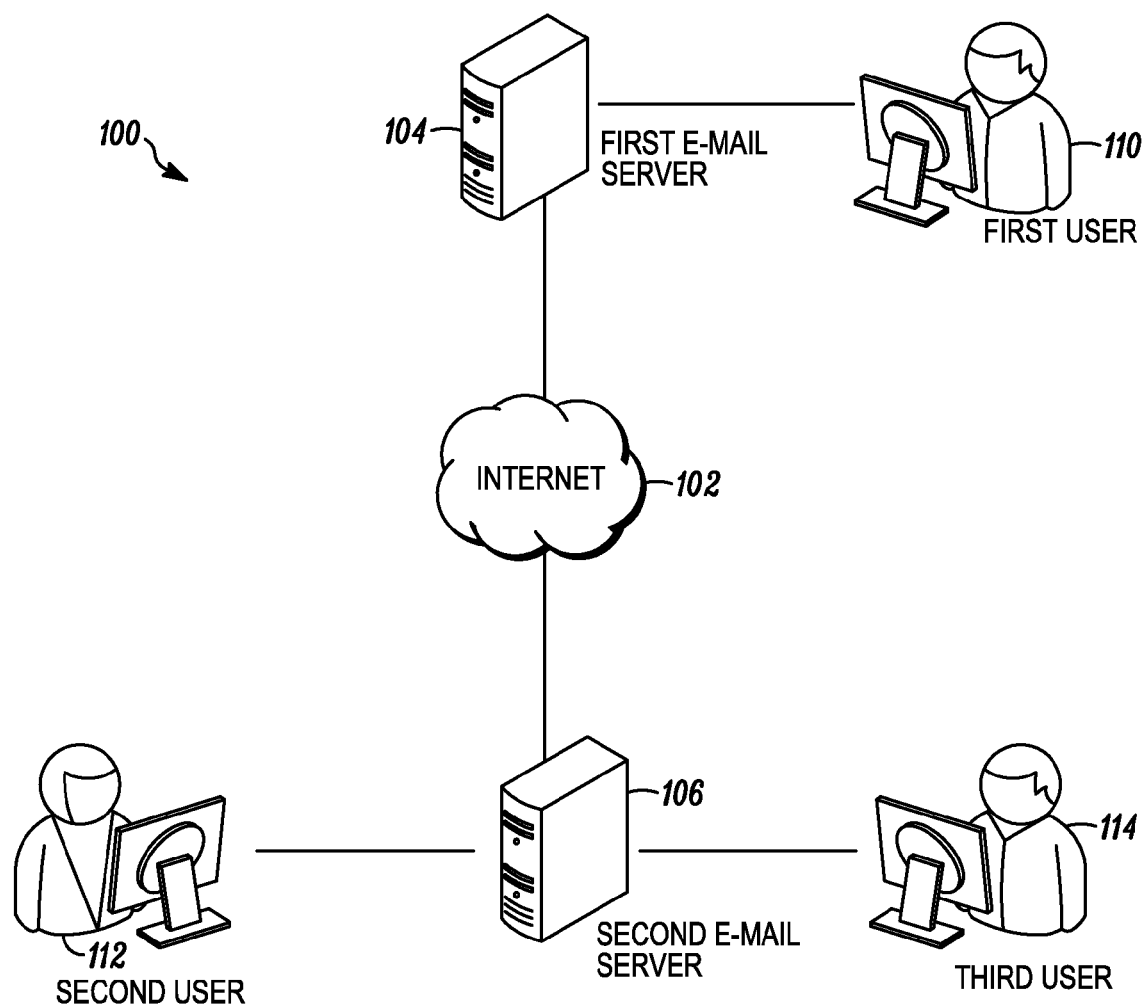
FIG. 1 illustrates a communication system for sending and receiving e-mails.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present teachings. In addition, the description and drawings do not necessarily require the order presented. It will be further appreciated that certain actions and/or steps may be described or depicted in a particular order of occurrence while those skilled in the art will understand that such specificity with respect to sequence is not actually required.

The apparatus and method components have been represented, where appropriate, by conventional symbols in the drawings, showing only those specific details that are pertinent to understanding the embodiments of the present teachings so as not to obscure the disclosure with details that will be readily apparent to those of ordinary skill in the art having the benefit of the description herein.

DETAILED DESCRIPTION

Generally speaking, pursuant to various embodiments described herein, the present disclosure provides a method and apparatus for a first account of an e-mail thread to send a reply e-mail to other accounts of the e-mail thread without revealing to the other accounts that the first account is a blind-carbon-copy account. In accordance with the teachings herein, a method performed by an electronic computing device for managing blind-carbon-copy account replies in e-mail communications includes detecting that a first e-mail account that is a first blind-carbon-copy recipient on an e-mail thread is sending a first reply e-mail, to a first received e-mail of the e-mail thread, to at least a first participant of a set of participants of the e-mail thread. The method further includes determining, from the set of participants of the e-mail thread, a first e-mail account adder that added the first e-mail account to the e-mail thread as the first blind-carbon-copy recipient and adding first text to the first reply e-mail indicating the first e-mail account adder forwarded the first received e-mail to the first e-mail account.

Also in accordance with the teachings herein is a method performed by an electronic computing device for managing blind-carbon-copy account replies in e-mail communications that includes detecting that a blind-carbon-copy recipient account of a received e-mail of an e-mail thread is replying to at least one participant of a set of participants of the e-mail thread. The method also includes sending an auto-generated e-mail to the at least one participant of the set of participants indicating the blind-carbon-copy recipient account is being added to the e-mail thread as a non-blind-carbon-copy recipient account and sending a reply e-mail from the non-blind-carbon-copy recipient account to the at least one participant of the set of participants after sending the auto-generated e-mail.

For one embodiment, detecting that the blind-carbon-copy recipient account is replying to at least one participant of the set of participants of the e-mail thread includes detecting that the blind-carbon-copy recipient account is replying to all participants of the set of participants of the e-mail thread. The detecting also includes adding the blind-carbon-copy recipient account to appear as a participant of the e-mail thread in e-mails of the e-mail thread sent after the auto-generated e-mail and removing blind-carbon-copy properties of the blind-carbon-copy recipient account from the e-mail thread.

For another embodiment, the method performed by the electronic computing device includes determining, from the set of participants of the e-mail thread, a blind-carbon-copy recipient account adder for the blind-carbon-copy recipient account. The auto-generated e-mail indicates the blind-carbon-copy recipient account adder is adding the blind-carbon-copy recipient account to the e-mail thread.

Consistent with an embodiment of the teachings herein is an electronic computing device configured to manage blind-carbon-copy account replies in e-mail communications that includes at least one communication interface configured to receive and send e-mail communications. The electronic computing device also includes a processing element operatively coupled to the at least one communication interface. The processing element is configured to detect that an e-mail account that is a blind-carbon-copy recipient of a received e-mail of an e-mail thread is sending a reply e-mail to at least one participant of a set of participants of the e-mail thread and determine, from the set of participants of the e-mail thread, an e-mail account adder that added the e-mail account to the e-mail thread as the blind-carbon-copy recipient. The processing element is further configured to send a notification to the at least one participant of the set of participants of the e-mail thread that indicates the e-mail account adder is adding the e-mail account to the e-mail thread as a non-blind-carbon-copy recipient account by the blind-carbon-copy adder.

An e-mail or electronic mail, as used herein, refers to an electronic transmission and distribution of a message over a computer network from one electronic computing device to another. Networks include, but are not limited to, local area networks (LANs), metropolitan area networks (MANs), campus area networks (CANS), wide area networks (WANs), and the Internet. An e-mail is sent by an author of the e-mail via an e-mail account of the author to one or more recipients of the e-mail via e-mail accounts belonging to the recipients.

An e-mail account is an arrangement with a company, government, educational institution, or other entity which allows the e-mail account to send and receive e-mail messages via an e-mail system or electronic infrastructure configured to pass e-mails between e-mail accounts using e-mail addresses. An e-mail address identifies an e-mail box to which e-mail messages are delivered for retrieval by a recipient of the e-mail messages. An example e-mail address includes a domain separated from a unique identifier for the domain by an "@" symbol. The unique identifier identifies an e-mail account, and in some instances, also an owner of the e-mail account.

An electronic computing device, also referred to herein simply as an electronic device, is any device, or combination of devices, that has the ability to transmit, receive, route, and/or deliver an e-mail. For example, an electronic device can include, but is not limited to, computers, tablets, phablets, and smartphones, each of which has a processing element and can execute an e-mail client program. An electronic computing device having a processing element and executing a client-based e-mail program, a web-based e-mail program, or an electronic computing device configured at a hardware level to operate as an e-mail client is referred to herein as an "e-mail client device" or simply as a "client device" or an "e-mail client." For client-based e-mail that is loaded directly onto a client device, the client device might execute an e-mail program such as Microsoft Outlook or Mozilla Thunderbird. For web-based e-mail that is viewed on the Internet, a client device might use a web browser, such as Mozilla Firefox or Microsoft Explorer, to browse to a web-based e-mail client program, such as Gmail or Yahoo Mail.

An electronic device can also include one or more e-mail server devices, also referred to herein simply as "e-mail servers," that route and deliver e-mails. The term "electronic device" can also refer collectively to an e-mail system that includes a combination of one or more devices configured to operate as e-mail client devices and one or more devices configured to operate as e-mail server devices.

A processing element of an electronic device includes arithmetic logic and control circuitry necessary to perform the digital processing, in whole or in part, for the electronic device to transmit, receive, route, and/or deliver e-mails in accordance with described embodiments for the present teachings. For one embodiment, the processing element represents a primary microprocessor, also referred to as a central processing unit (CPU), of the electronic device. For example, the processing element can represent an application processor of a smartphone. In another embodiment, the processing element is an ancillary processor, separate from the CPU, wherein the ancillary processor is dedicated to providing the processing capability, in whole or in part, needed for the electronic device to perform at least some of its intended functionality.

When a meaning is clear from context, strict adherence to distinguishing between e-mail accounts and account owners is sometimes relaxed for brevity and/or readability. For instance, "Frank sends an e-mail to Faye" might be written in place of and understood to mean that "Frank uses his e-mail account and an electronic device running an e-mail client to send an e-mail to an e-mail account belonging to Faye."

Referring now to the drawings, FIG. 1 shows an e-mail system 100 that includes a first e-mail server 104 and a second e-mail server 106 used to communicate e-mail messages over the Internet 102 between a user 110 associated with a first domain and users 112 and 114 associated with a second domain. In one example scenario, the email system 100 is used by the first user 110 of the e-mail system 100 to send an e-mail across the Internet 102 to the second 112 and third 114 user of the e-mail system 100. When the first user 110 uses a computer, smartphone, or other electronic device running an e-mail client to author and send the e-mail, the e-mail is transmitted to a Simple Mail Transfer Protocol (SMTP) server included within the first e-mail server 104 that serves the first domain to which the first user's e-mail account belongs. From recipient e-mail addresses included with the e-mail sent by the first user 110, the SMTP server determines that e-mail accounts of the second 112 and third 114 users belong to the second domain.

The SMTP server queries a domain name server (DNS) for an Internet Protocol (IP) address of the second e-mail server 106, which serves the second domain. The SMTP server then transmits the e-mail to the second e-mail server 106 using the IP address. A post office protocol (POP) or an internet message access protocol (IMAP) server included within the second e-mail server 106 stores copies of the e-mail in files associated with the accounts of the second 112 and third 114 users as determined from the unique indentifies included in the recipient e-mail addresses. The second 112 and third 114 users retrieve the e-mail from the POP or IMAP server when they next access their e-mail accounts, for example, by using an e-mail client to connect with the second e-mail server 106.

The second 112 user can also use her e-mail account to send a reply e-mail back to the first user 110 and copy the third user 114. Using an electronic device and her e-mail account, the second user 112 transmits the reply e-mail to the second e-mail server 106. The second e-mail server 106 determines from the e-mail address of the third user 114 included with the reply e-mail that the e-mail account of the third user 114 belongs to the second domain. The second e-mail server 106 simply passes a copy of the reply e-mail from an SMTP server included within the second e-mail server 106 to its POP or IMAP server for delivery. The second e-mail server 106 uses an IP address of the first e-mail server 104 to transmit another digital copy of the reply e-mail to a POP or IMAP server within the first e-mail server 104 for delivery to the first user 110.

A passing of one or more e-mails and at least one reply e-mail between two or more users, or more accurately, between e-mail accounts of the two or more users, results in an e-mail thread. Any user's e-mail account that is involved in an e-mail thread can receive an e-mail of the e-mail thread as an ordinary recipient account, a carbon copy (CC) recipient account, or a blind carbon copy (BCC) recipient account of the e-mail thread. An ordinary recipient account of an e-mail thread is also referred to herein as an "ordinary recipient," an "ordinary account," or an "ordinary participant" of the thread. A CC recipient account of an e-mail thread is also referred to herein as a "CC recipient," a "CC account," or a "CC participant" of the thread. A BCC recipient account is referred to herein as a "BCC recipient" or a "BCC account" of the thread. Ordinary and CC recipients are considered to be participants of an e-mail thread, whereas BCC recipients are not participants of the e-mail thread. Each type of account is described with reference to FIG. 2.

Figure 2:
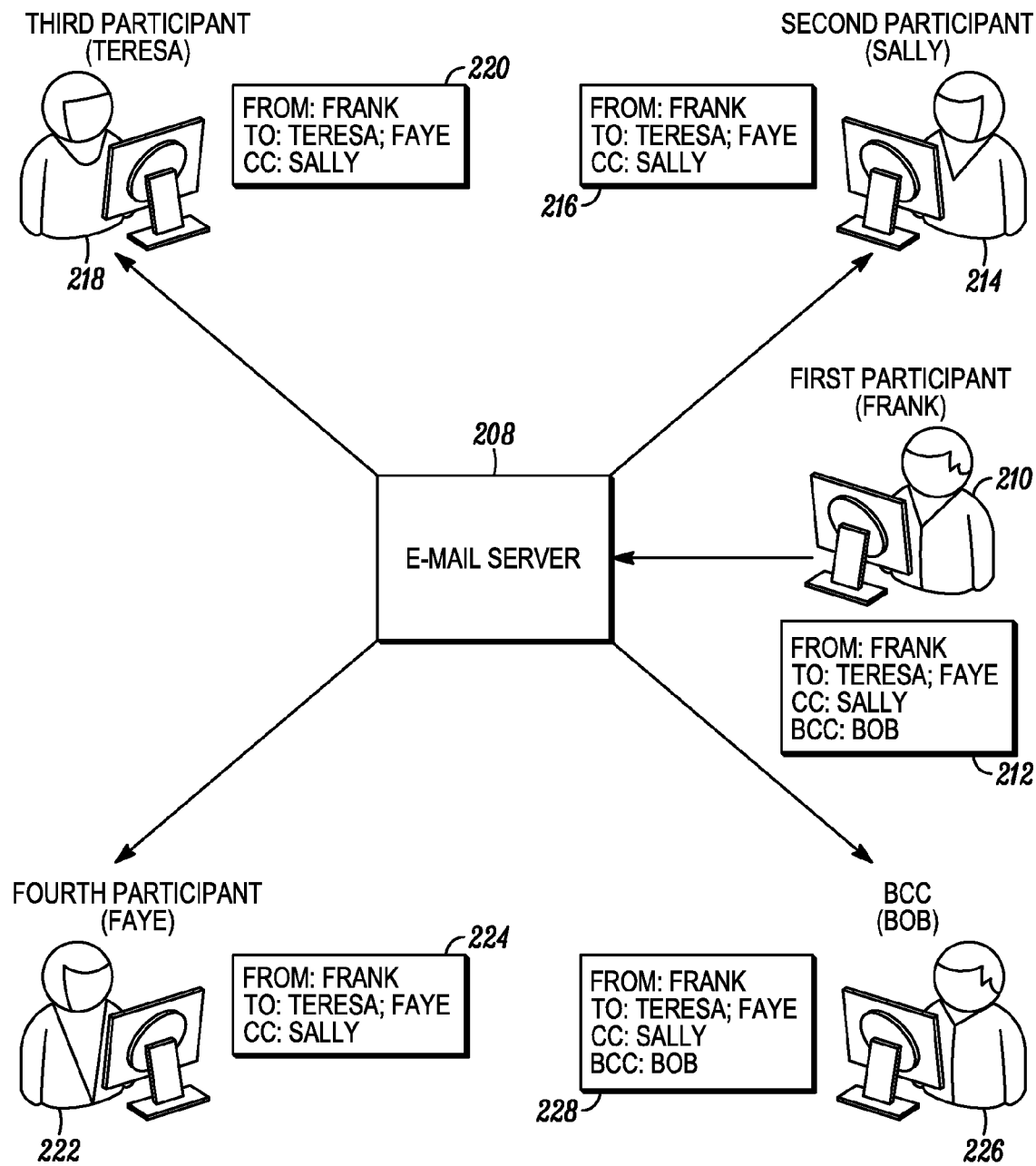
FIG. 2 illustrates an e-mail server managing different e-mail accounts.

FIG. 2 shows four participants, Frank 210, Sally 214, Teresa 218, and Faye 222, each having his or her own e-mail account and each participating in an e-mail thread. FIG. 2 also shows Bob 226 as a BCC recipient on the e-mail thread. Frank 210 is the originator of a first e-mail of the e-mail thread. A portion of a header for the first e-mail as sent by Frank 210 and received by Sally 214, Teresa 218, Faye 222, and Bob 226 is shown at 212, 216, 220, 224, and 228, respectively. A header of an e-mail is separate from a body (i.e., content text) of the e-mail and includes routing, time, date, sender, and recipient information. The portions of headers shown and described herein shall be referred to as "headers" but include only sender and recipient information for explanatory purposes.

Frank 210 drafts the first e-mail on his computer and uses an e-mail client and his e-mail account to transmit the first e-mail to an e-mail server 208 for delivery. For the embodiment shown in FIG. 2, the e-mail server 208 acts as both an SMTP server and a POP or IMAP server for all the e-mail accounts participating in or receiving e-mails of the e-mail thread. This is because all the e-mail accounts are associated with a single domain. For example, all the senders and recipients 210, 214, 218, 222, 226 are employees of a same corporation. The use of a single e-mail server within described embodiments and shown in figures herein is done for ease of explanation. For every described embodiment involving the use of a single e-mail server, a plurality of additional embodiments involving multiple e-mail servers are consistent with the present teachings. For example, there may be a different e-mail server serving each of a plurality of domains that includes one or more e-mail accounts that are involved in an e-mail thread.

Sally 214, Teresa 218, Faye 222, and Bob 226 each receive the first e-mail to their e-mail accounts. Frank 210 sends the first e-mail to Teresa 218 and Faye 222 as ordinary recipients. That is, Frank lists Teresa 218 and Faye 222 within a "to" field of the header 212. Frank 210 designates Sally's e-mail account as a CC account on the first e-mail by listing Sally 214 in a "CC" field of the header 212. The "CC" field for an e-mail is typically populated when the e-mail is intended for ordinary recipients but is also relevant to other people. Frank 210 also adds Bob 226 to the first e-mail by designating Bob's e-mail account as a BCC account in the "BCC" field of the header 212.

The header 220 of the first e-mail received by Teresa 218 shows the e-mail was sent by Frank 210 and that Faye 222 is also an ordinary recipient of the e-mail. The header 220 also shows that Sally 214 was copied on the first e-mail. Similarly, the header 224 on the copy of the email received by Faye 222 shows that Faye 222 is an ordinary recipient of the first e-mail sent by Frank 210 and that Teresa 218 is the other ordinary recipient. The e-mail header 224 also shows that Sally 214 is the CC recipient of the first e-mail. Sally 214 sees from the header 216 that the first e-mail was sent by Frank 210, that she is listed as a CC account, and that Teresa 218 and Faye 222 are both ordinary recipients of the e-mail. None of the headers 216, 220, and 224 indicate that Bob's account was added by Frank 210 to the first e-mail as a BCC account or that Bob 226 received a copy of the first e-mail.

Frank 210, Sally 214, Teresa 218, and Faye 222 are all participants of the e-mail thread started by Frank's e-mail. Each participant is visible to every other participant within the headers 212, 216, 220, 224 of the e-mails of the e-mail thread. As shown by the headers 216, 220, and 224, Bob 226 is not a participant to the e-mail thread because he is not visible to Sally 214, Teresa, or Faye 222.

Because Frank 210 added Bob's e-mail account to the first e-mail, and hence to the email thread, as a BCC account, Frank 210 is an "adder" of the BCC account. An adder of a BCC account is also referred to herein as a "BCC adder," an "e-mail account adder" and a "BCC recipient adder." A BCC account is configured to receive a copy of an e-mail an adder of the BCC account sends but not to be revealed to other recipients of the e-mail, other than possibly other BCC recipients. For one embodiment, the BCC account receives only the e-mail the adder of the BCC account sends. It does not receive any reply e-mail from a non-BCC recipient of the initial e-mail unless that recipient also adds the BCC account to the reply e-mail. In another embodiment, the BCC account also receives reply e-mails from non-BCC recipients of the initial e-mail sent by the BCC adder. This is without the knowledge on the part of the recipients replying that a copy of the e-mail they are sending is also being received by the BCC account.

Figure 3:
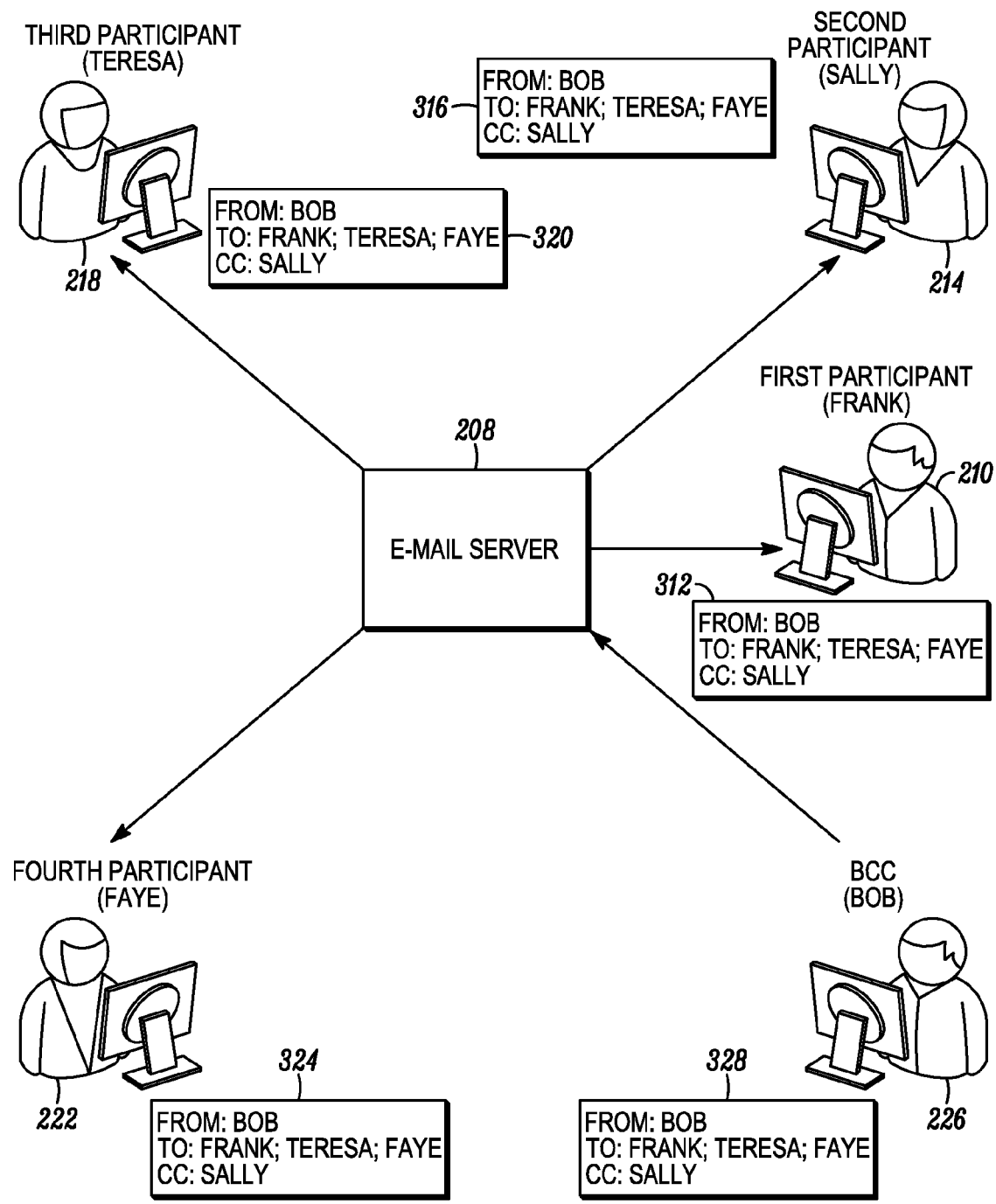
FIG. 3 illustrates an e-mail server managing different e-mail accounts.

In FIG. 3, Bob 226 replies to Frank's e-mail, and in so doing, transitions from a BCC recipient to a participant of the e-mail thread depicted by FIGS. 2 and 3. In particular, FIG. 3 shows Bob 226 transmitting a reply e-mail to the e-mail server 208 in response to the first e-mail sent by Frank 210. The e-mail server 208, in turn, sends Bob's reply e-mail to the other participants 210, 214, 218, 222. In hitting "reply to all" from within an e-mail client, for example, Bob 226 designates that Frank 210, Teresa 218, and Faye 222 will each receive Bob's reply e-mail as an ordinary participant, and that Sally 214 will receive Bob's e-mail as a CC participant. This is indicated by a header 328. Headers 312, 316, 320, and 324 prepend copies of the reply e-mail received by Frank 210, Sally 214, Teresa 218, and Faye 222, respectively, and indicate to each participant that the reply e-mail was sent by Bob 226.

Bob's reply e-mail might also include the original text of Frank's first e-mail. This could come as a surprise to Sally 214, Teresa 218, and Faye 222 who were not made aware by Frank's initial email that Frank 210 included Bob's e-mail account as a BCC account to the e-mail thread. An awkward situation for any or all participants to the e-mail thread, especially for those participants who may have sent e-mails without realizing that Bob was included on the e-mail thread as a BCC recipient, can be avoided by presenting the appearance to the other participants that Bob 226 was just added to the e-mail thread as a participant without ever having been a BCC recipient.

In accordance with embodiments of the present teachings, FIGS. 4 and 5 show a series of e-mails 442, 444, and 448 sent by Frank 210, Teresa 218, and Bob 226, respectively, in an e-mail thread 400. For a particular embodiment, Frank 210 sending the e-mail 442 is depicted by FIG. 2, and Bob 226 sending the e-mail 448 is depicted by FIG. 3. In the e-mail 442, Frank 210 asks Teresa 218 for an update on a driver assembly for headphones manufactured by a company that employs Frank 210, Sally 214, Teresa 218, Faye 222, and Bob 226. Teresa 218, who presumably designs and produces driver assemblies with Faye 222, replies with the e-mail 444 indicating that she is behind schedule due to an unforeseen complication.

Bob 226, who was added to the e-mail thread 400 by Frank 210 as a BCC recipient, wishes to send the e-mail 448 to the participants of the thread 400. Bob 226 hits "reply all" on an e-mail client running on his computer or another electronic device. In so doing, functionality integrated into the electronic device running the e-mail client and/or the e-mail server 208 works to prevent revealing to participants of the e-mail thread 400 that Bob 226 is a BCC recipient. For an embodiment shown in FIG. 4, the e-mail client and/or the e-mail server 208 appends an indication 446, also referred to herein as a notification, to Bob's e-mail 448 indicating that Frank 210 forwarded the e-mails 442 and 444 to Bob 226. For an embodiment, the indication 446 includes text that is added to Bob's reply e-mail 448. In a particular embodiment, the e-mails 442 and 444 appear in Bob's e-mail 448 below the indication 446, as if Frank 210 had actually forwarded the e-mails 442 and 444 to Bob 226. The indication 446 is constructed to lead Teresa 218, Faye 222, and Sally 214 to believe that Frank 210 forwarded the e-mails 442 and 444 to Bob 226 and that Bob was never a BCC recipient on the e-mail thread 400.

FIG. 5 shows another embodiment in which Bob 226 sends the e-mail 448 to the participants of the e-mail thread 400 without revealing that he was added to the thread 400 as a BCC recipient. When Bob 226 hits "reply all" on his e-mail client, an indication 546 is automatically added to the e-mail thread 400 that is sent out separately from Bob's reply e-mail 448. The indication 546 indicates that Frank 210 added Bob 226 as a participant to the e-mail thread 400. In a particular embodiment, the indication 546 indicates that Frank 210 added Bob 226 at a time when Bob 226 hit "reply all" on his e-mail client. In another embodiment, the indication 546 indicates that Frank 210 added Bob 226 at a time when Bob 226 hit "send" on his e-mail client. The indication 546 is configured to lead Teresa 218, Faye 222, and Sally 214 to believe that Frank 210 just added Bob 226 as a participant to the e-mail thread 400.

Figure 6:
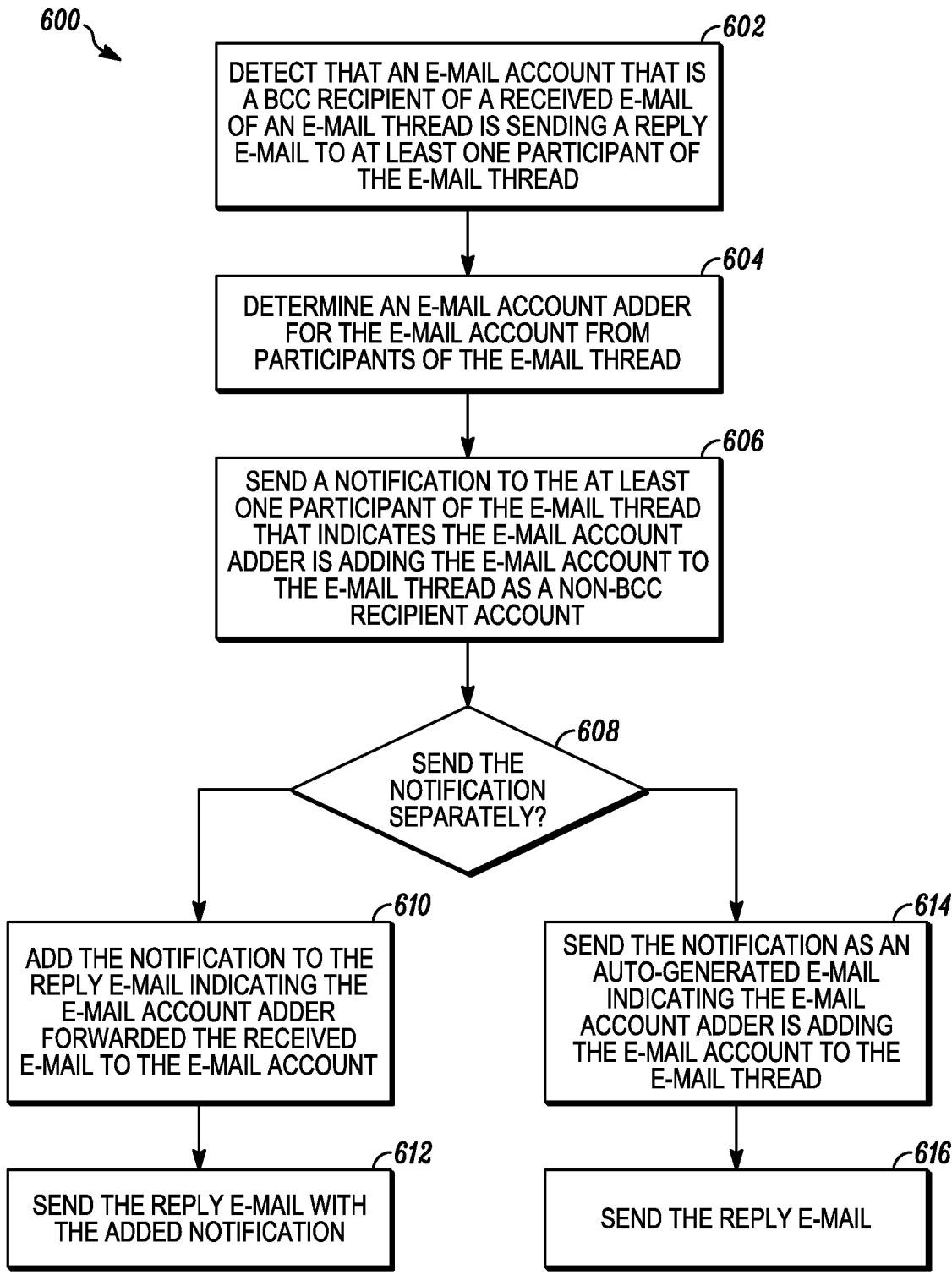
FIG. 6 shows a logical flow diagram illustrating a method of adding a blind-carbon-copy e-mail account to an e-mail thread.

By way of a logical flow diagram, FIG. 6 illustrates a method 600 performed by an electronic device for which a BCC recipient is added to an e-mail thread as a participant without revealing to other participants that he or she was previously added as a BCC recipient. Specifically, the electronic device detects 602 that an e-mail account that is a BCC recipient of a received e-mail of an e-mail thread is sending a reply e-mail to at least one participant of the e-mail thread. For instance, the electronic device (e.g., the e-mail server 208 and/or Bob's computer) detects that Bob 226 intends to send or is sending the reply e-mail 448. In different embodiments, the electronic device detects that Bob 226 intends to send the reply e-mail 448 when Bob 226 hits "reply all" or that Bob 226 is sending the reply e-mail 448 when Bob 226 hits "send" in his e-mail client.

The electronic device also determines 604 an e-mail account adder for the BCC recipient. The electronic device determines the e-mail account adder for the BCC recipient of the e-mail thread by determining a sending account of a prior e-mail of the e-mail thread to which the BCC recipient was added as a BCC account. The sending account is the e-mail account which sent the e-mail to which the BCC recipient was added. Continuing with the current example, the electronic device determines that Frank 210 added Bob 226 to the e-mail thread 400 as a BCC recipient. For an embodiment, this determination is made using data logged by the e-mail server 208 in connection with e-mails of the e-mail thread 400. For an embodiment, the e-mail server 208 determines the BCC account adder from structured data or a lookup table.

Figure 7:
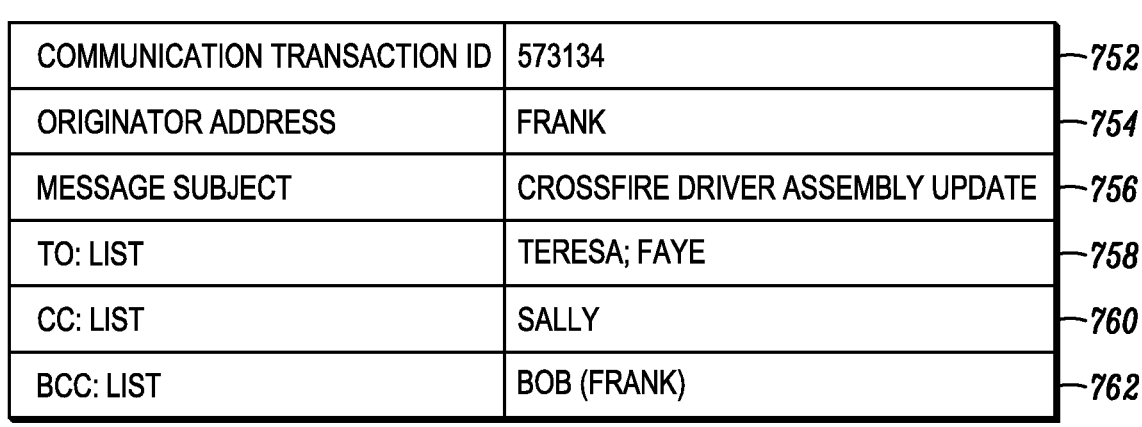
FIG. 7 shows structured data records associated with an e-mail of an e-mail thread.

Turning momentarily to FIG. 7, a data structure 700 is shown for the e-mail 442 that Frank 210 sent to Teresa 218. The data structure 700 is shown as a table of six rows and two columns, wherein each row represents a structured data record. A structured data record is formatted information that specifies a quality, fact, or characteristic about an e-mail of an e-mail thread.

The first column of the data structure 700 represents type fields that specify types of data records stored within data value fields of the data structure 700. Specifically, the types of data records specified include: a communication transaction identification (ID), an originator address, a message subject, a "to" list, a "CC" list, and a "BCC" list.

The second column of the data structure 700 represents the data value fields. Within the data value fields, the electronic device stores alphanumeric strings of characters that represent data values. The data value 752 is a number by which the electronic device identifies the e-mail 442. The data value 754 indicates Frank 210 sent the e-mail 442. The data value 756 identifies the message in the subject line of the e-mail 442. The data value 758 indicates the e-mail 442 was sent to Teresa 218 and Faye 222. The data value 760 indicates Sally 214 was copied on the e-mail 442, and the data value 762 indicates that Bob 226 was added as a BCC recipient to the e-mail 442.

Data structures similar to the data structure 700 are stored by the electronic device for each e-mail of the e-mail thread 400. For one embodiment, the electronic device appends an additional data structure generated with each new e-mail to a data structure generated for previous e-mails. In this way, a data table is created that includes individual stored records for all the e-mails sent within an e-mail thread. For another embodiment, the electronic device scans the data structures in reverse chronological order until it determines from the data structure 700 that Frank 210 first added Bob 226 to the e-mail thread 400 as a BCC recipient in the e-mail 442.

Returning to FIG. 6, the method 600 further includes the electronic device sending 606 a notification to the at least one participant of the e-mail thread. The notification indicates that the BCC account adder is adding the BCC recipient account to the e-mail thread as a non-BCC recipient account (e.g., as an ordinary participant). The electronic device either sends the notification as part of the BCC recipient's reply e-mail, or it sends the notification separately from the reply e-mail. The e-mail server 208, for example, can send the notification 446 indicating that Frank 210 is adding Bob 226 to the e-mail thread 400 as a participant by appending the notification 446 to Bob's reply e-mail 448, as indicated by FIG. 4. The e-mail server 208 can also send a notification separately from the reply e-mail 448, as indicated by FIG. 5.

For a particular embodiment, if the electronic device determines that an e-mail account that is a BCC recipient of a received e-mail of an e-mail thread is sending a reply e-mail to only the account of the BCC account adder, then the electronic device does not send a notification to any participants of the e-mail thread. For example, the electronic device detects 602 that Bob 226 is sending a reply e-mail of an e-mail thread to only Frank 210. The electronic device also determines 604 that Frank 210 added. Bob 226 to the e-mail thread as a BCC account. In this instance, no notifications are sent to any participants of the e-mail thread indicating that Bob 226 is being added to the e-mail thread.

If the electronic device determines 608 it is sending a notification separately from the BCC recipient's reply e-mail, then prior to sending the reply e-mail, the electronic device sends 614 the notification as an auto-generated e-mail indicating that the BCC account adder is adding the BCC recipient account to the e-mail thread. The electronic device then sends 616 the BCC recipient's reply e-mail after and separately from the auto-generated notification. "Auto-generated" means that after the electronic device determines it will be sending a separate notification to participants of the e-mail thread, the electronic device generates and sends the e-mail that serves as the notification automatically, without input from the BCC recipient.

For a particular embodiment, when the electronic device sends 614 the separate auto-generated notification, the device determines a time delay period and delays sending the reply e-mail for the time delay period after sending the notification. The purpose of the notification is to present the appearance to participants of the e-mail thread that the BCC recipient was just added to the thread. If the BCC recipient was just being added to the e-mail thread without having previously received e-mails from the thread, then the BCC recipient would need time to read the e-mails he would just be receiving. Only after reading the e-mails could the newly added participant draft and send a reply e-mail. To maintain the appearance that the newly added participant was never a BCC recipient on the e-mail thread, the electronic device adds the time delay period.

In a first embodiment, the electronic device determines the time delay period based on a length of an e-mail the BCC recipient receives. Referring to FIG. 5, for example, Bob 226 receives Teresa's e-mail 444. After reading Teresa's e-mail 444, Bob 226 decides to reply, drafts the reply e-mail 448, and hits "send" from within an e-mail client. The electronic device, whether it is Bob's computer running the e-mail client or the e-mail server 208, sends the auto-generated notification 546 indicating to participants of the e-mail thread that Bob 226 was just added to the thread by Frank 210. Although Bob 226 has hit "send," the electronic device delays delivering Bob's reply e-mail 448 to Frank 210, Teresa 218, Faye 222, and Sally 214 for 90 seconds based on the length of Teresa's e-mail 444 as determined from a character count of the e-mail 444. If Teresa's e-mail 444 were longer, the time delay period might be longer, for instance 120 seconds.

In a second embodiment, the electronic device determines the time delay period based on a combined length of multiple e-mails. For instance, the time delay period may be determined from the combined length of the e-mails 442 and 444. In an additional embodiment, the electronic device also bases the determination of the time delay period on the reply e-mail 448 Bob 226 is sending.

In a third embodiment, the electronic device determines the time delay period based on content of an e-mail the BCC recipient receives. If the content of a received email is more casual, then the electronic device uses a shorter time delay period relative to when the e-mail is more complex. An e-mail that is more technical or that includes numbers or formatted data results in the electronic device using a relatively longer time delay period. An e-mail that is more technical or otherwise more complex generally takes longer to read and comprehend than a casual e-mail.

In a fourth embodiment, the electronic device adds time to the time delay period if the e-mail the BCC recipient receives includes an attachment. The electronic device might also determine the size and/or content of the attachment in determining the time delay period. In a fifth embodiment, the electronic device adds time to the time delay period if the e-mail the BCC recipient receives includes a hypertext link. The electronic device might also add an amount of time to the time delay period that is proportional to the number of hypertext links in the the e-mail the BCC recipient receives.

In a first example, the e-mail server 208 scans Teresa's e-mail 444 when the server 208 determines that Bob 226 is replying to the e-mail 444. Using an algorithm programmed by a developer or a system administrator, the e-mail server 208 compares the words and characters of Teresa's e-mail 444 against an electronic dictionary or database of common English words. In doing so, the electronic device matches 98% of the words in the e-mail 444 with words included in the dictionary. As a result, the electronic device determines the e-mail 444 is casual and uses a time delay period of 90 seconds. In a second example, the e-mail 444 is very technical and includes terms of art. The electronic device determines that only 76% of the words in the e-mail 444 are included in the electronic dictionary or word database. Based on this, the electronic device uses a time delay period of 120 seconds.

In a third example, using the text and character recognition algorithm, the e-mail server 208 determines that the e-mail 444 includes data, such as numbers or formatted tables. As a result, the e-mail server 208 increases the time delay period it uses relative to a time delay period it would have used if the e-mail had included less data. In a further embodiment, the electronic device uses a time delay period based on both the length and complexity of an e-mail or a series of e-mail a BCC recipient receives. In different embodiments, the time delay period is a variable that assumes discrete or continuous values.

If the electronic device determines 608 it is sending the notification together with the BCC recipient's reply e-mail, then the electronic device adds 610 the notification to the BCC recipient's reply e-mail. The electronic device then sends 612 the reply e-mail to participants of the e-mail thread. For an embodiment, the notification indicates the BCC recipient account adder added the BCC recipient account to the e-mail thread by forwarding one or more previous e-mails of the e-mail thread to the BCC recipient.

In a first embodiment, the electronic computing device is configured to detect 602 that a BCC recipient account of an e-mail thread is sending a reply e-mail, to determine 602 a BCC recipient account adder, and to send 606 a notification indicating the BCC recipient account adder is adding the BCC recipient account as a non-BCC recipient to the e-mail thread. In a first instance, the electronic computing device is an e-mail client device. In a second instance, the electronic computing device is an e-mail server device. In a third instance, both an e-mail client device and an e-mail server device are configured to perform the functionality indicated above in combination. The functionality of the one or more electronic computing devices so configured is described in greater detail with respect to FIGS. 8, 9, and 10.

Figure 8:
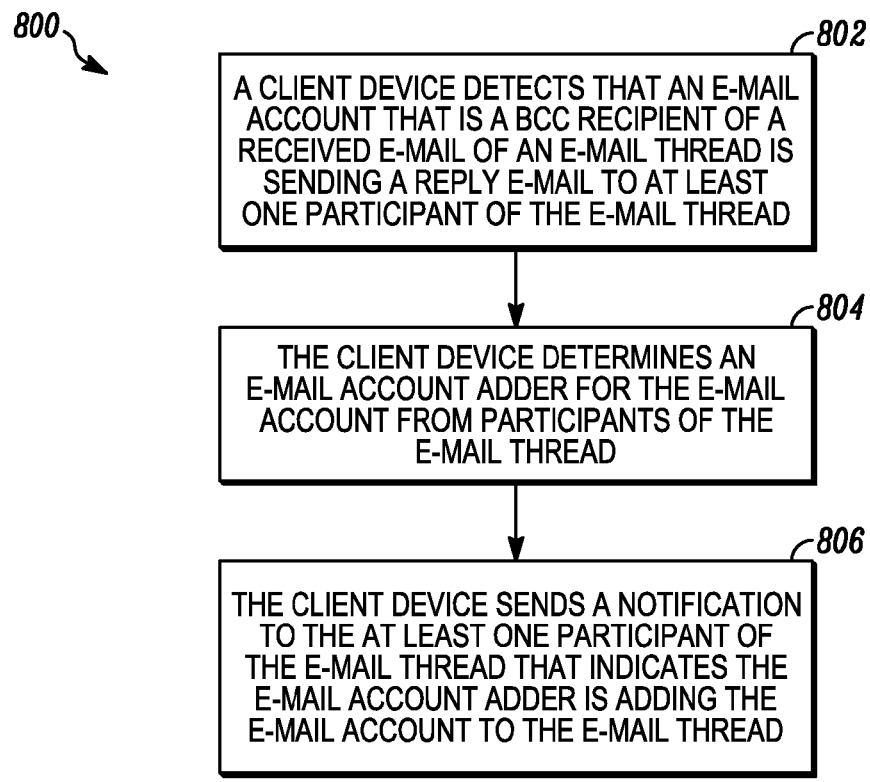
FIG. 8 shows a logical flow diagram illustrating a method of adding a blind-carbon-copy e-mail account to an e-mail thread.

FIG. 8 shows a method 800 for which an e-mail client device is configured to perform the functionality indicated by the method 600. An e-mail client device, as used here, is an electronic computing device that runs an e-mail client being used by a BCC recipient account to send a reply e-mail to participants of an e-mail thread. The e-mail client device detects 802 that an e-mail account that is a BCC recipient of a received e-mail of an e-mail thread is sending a reply e-mail to at least one participant of the e-mail thread. The e-mail client device also determines 804 an account adder for the BCC recipient account. For an embodiment, the e-mail client device determines the BCC recipient account adder from one or more data records for the e-mail thread, such as from the data records shown for the data structure 700 stored within a memory of the e-mail client device. After having determined the BCC recipient account adder, the e-mail client device sends 806 the notification to participants of the e-mail thread indicating the BCC recipient account is being added to the e-mail thread.

Figure 9:
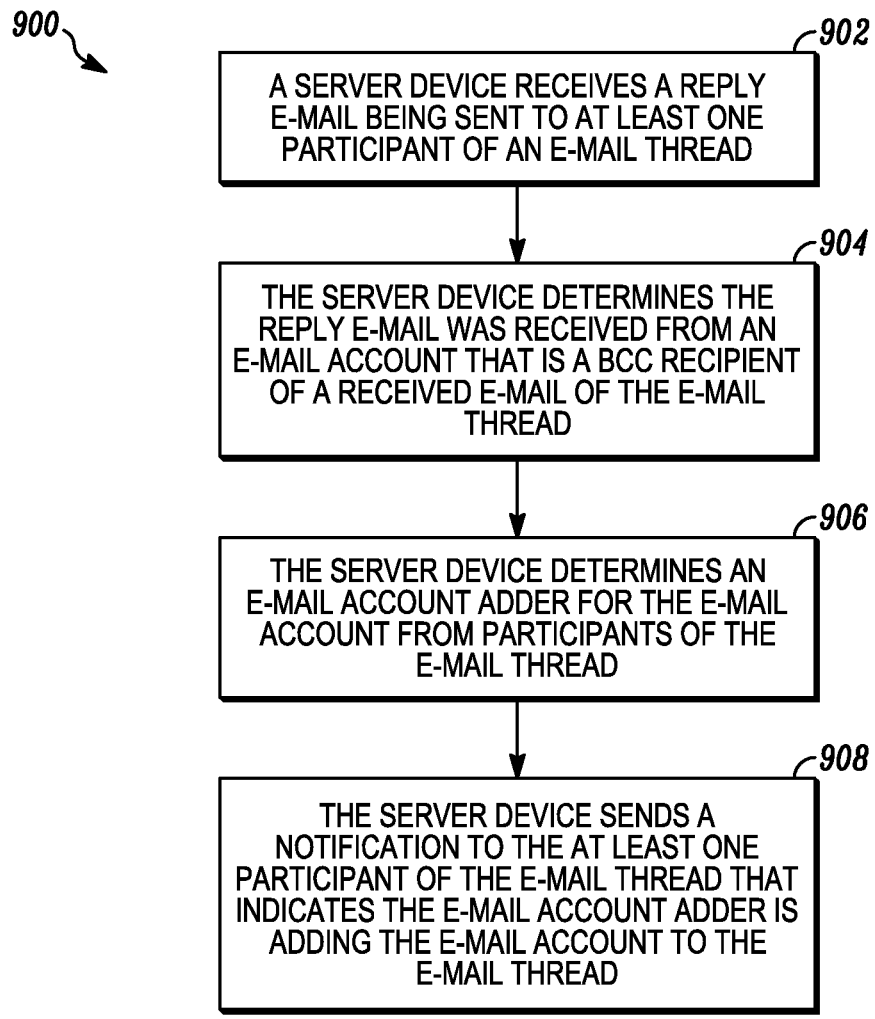
FIG. 9 shows a logical flow diagram illustrating a method of adding a blind-carbon-copy e-mail account to an e-mail thread.

FIG. 9 shows a method 900 for which an e-mail server device, such as the e-mail server 208, is configured to perform the functionality indicated by the method 600. The e-mail server device receives 902 a reply e-mail being sent to at least one participant of an e-mail thread, and determines 904 that the reply e-mail was received from a BCC recipient account on the e-mail thread. The e-mail server device determines 906 a BCC recipient account adder for the BCC recipient account from participants of the e-mail thread. The e-mail server device makes this determination, for example, using structured data logs, such as the data structure 700, stored in a memory of the e-mail server device. The e-mail server device then sends 908 a notification to the at least one participant of the e-mail thread that indicates the BCC recipient account adder is adding the BCC recipient account to the e-mail thread as a participant.

Figure 10:
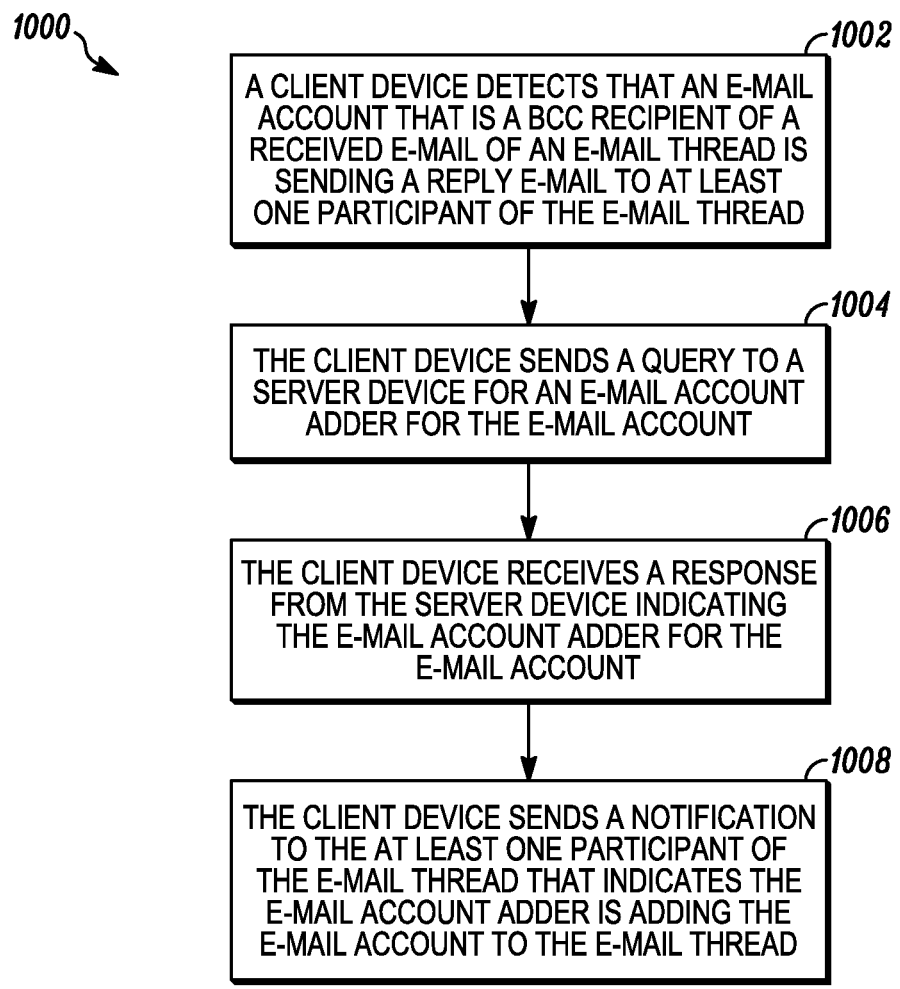
FIG. 10 shows a logical flow diagram illustrating a method of adding a blind-carbon-copy e-mail account to an e-mail thread.

FIG. 10 shows a method 1000 for which an e-mail client device and an e-mail server device perform the functionality indicated by the method 600 in combination. In particular, determining 604 a BCC recipient account adder from participants of an e-mail thread includes the e-mail client device sending a query to the e-mail server device and receiving a response to the query from the e-mail server device, wherein the response indicates the BCC recipient account adder. With reference to FIGS. 3 and 4, for example, an e-mail client device, such as a computer being used by Bob 226, detects 1002 that Bob 226 is sending the reply e-mail 448 to participants of the e-mail thread 400 after receiving the e-mail 444 from Teresa 218 as a BCC recipient. To determine who added Bob 226 to the e-mail thread 400 as a BCC recipient, Bob's computer queries 1004 the e-mail server device 208.

A data log including the data structure 700 for the e-mail thread 400 is being stored by the e-mail server device 208. In response to the query from Bob's computer, the e-mail server device 208 accesses its data log and determines that Frank 210 added Bob 226 to the e-mail thread 400 as a BCC recipient. The e-mail server device 208 sends this information to Bob's computer. For an embodiment, Bob's computer and the e-mail server device 208 message one another using a modified application layer Internet protocol such as IMAP or POP. In an alternate embodiment, another protocol, consistent with the teachings herein, is used which allows Bob's computer to query the e-mail server device 208 and receive the identity of the BCC recipient account adder.

After Bob's computer receives 1006 the response to its inquiry identifying Frank's e-mail account as having added Bob's e-mail account to the thread 400 as a BCC recipient, Bob's computer sends a notification to at least one participant of the e-mail thread 400. The notification indicates to the at least one participant of the e-mail thread 400 that Frank added Bob to the thread 400 as a participant.

For a particular embodiment, there is a first BCC recipient and also one or more additional BCC recipients on an e-mail thread with each BCC recipient added to the thread by different BCC recipient adder. After an electronic device sends a first reply e-mail from the first BCC recipient to participants of the e-mail thread with first added text indicating the first BCC recipient was added to the thread by a first BCC recipient adder, the electronic device detects that a second BCC recipient, different from the first BCC recipient, is sending a second reply e-mail to participants of the e-mail thread in response to a second received e-mail. The electronic device determines a second BCC recipient adder that added the second BCC recipient to the e-mail thread. The electronic device then adds second text to the second reply e-mail indicating the second BCC recipient adder added the second BCC recipient to the e-mail thread by forwarding the second received e-mail to the second BCC recipient.

For an embodiment, the electronic device determines the second BCC recipient adder by referencing a stored data log for the e-mail thread or by querying a second electronic device that references the data log. FIG. 11 shows a data structure 1100 forming part of a data log for an e-mail thread that includes a record of BCC recipient adders for the e-mail thread. Data value 1152 indentifies an e-mail of the e-mail thread. Data values 1154, 1156, 1158, and 1160 indicate a sender, a subject, general recipients, and a CC recipient, respectively, for the identified e-mail. A data value 1162, which forms part of the record of BCC recipient adders for the e-mail thread, indicates that Bob 226 is a first BCC recipient of the e-mail thread and that Bob 226 was added by Frank 210. The data value 1162 also indicates that a BCC recipient account for Bill was added to the e-mail thread by Teresa 218.

For another embodiment, an electronic device determines that there are two or more different BCC recipient adders, each of which added the same BCC recipient to an e-mail thread. The electronic device then selects one of the two or more BCC recipient adders and sends a notification to participants of the e-mail thread indicating that the selected BCC recipient adder added the BCC recipient to the thread as a participant. For a particular embodiment, the electronic device adds text to a reply e-mail sent by BCC recipient indicating that the selected BCC recipient adder forwarded a received e-mail to the BCC recipient.

FIG. 12 shows a data structure 1200 forming part of a data log for an e-mail thread that includes a record of two BCC recipient adders adding the same BCC recipient to the thread. Data value 1252 indentifies an e-mail of the e-mail thread. Data values 1254, 1256, 1258, and 1260 indicate a sender, a subject, general recipients, and a CC recipient, respectively, for the identified e-mail. A data value 1262 indicates that both Teresa 218 and Faye 222 added a colleague Bill to the e-mail thread as a BCC recipient. For example, Teresa 218 sends an e-mail to participants of the e-mail thread and adds Bill as a BCC recipient on her e-mail. At a later time, Faye 222 sends an e-mail to participants of the e-mail thread. Being unaware that Teresa 218 has added Bill to the e-mail thread as a BCC recipient, Faye 222 also adds Bill as a BCC recipient to the e-mail she sends.

In a first embodiment, when a first and second BCC recipient adder both add the same BCC recipient to an e-mail thread, an electronic device selects the first BCC recipient adder over the second BCC recipient adder when the device determines that the first BCC recipient adder added the BCC recipient before second BCC recipient adder added the BCC recipient. For example, the e-mail server 208 detects that Bill is sending a reply e-mail to participants of the e-mail thread. The e-mail server 208 adds a notification to Bill's reply e-mail, or sends a separate auto-generated notification, indicating that Bill is being added as a participant to the e-mail thread by Teresa 218 because Teresa 218 was the first to add Bill to the thread as a BCC recipient.

In a second embodiment, the electronic device prompts the BCC recipient for feedback and selects the first BCC recipient adder over the second BCC recipient adder based on the feedback. For example, after detecting that Bill is sending a reply e-mail, a computer Bill is using to send the e-mail prompts Bill to select either Teresa 218 or Faye 222 for the purpose of indicating that either Teresa 218 or Faye 222 is adding Bill to the e-mail thread as a participant. It might be the case that even though Teresa 218 was the first to add Bill as a BCC recipient, Bill has an interest in not revealing to one or more participants of the e-mail thread that Teresa 218 forwarded to him e-mails of those one or more participants.

In a third embodiment, the electronic device prompts at least one of multiple BCC recipient adders for the same BCC recipient for feedback. The electronic device then selects one BCC recipient adder over another BCC recipient adder based on the feedback it receives. For example, in sending a reply e-mail to participants of an e-mail thread, Bill seeks permission from Teresa 218 to indicate that Teresa 218 is the participant adding Bill to the e-mail thread. Bill sends a prompt for permission from his computer or smartphone to Teresa 218 via the e-mail server 208. Teresa 218 then responds with feedback granting Bill permission to indicate that Teresa 218 is adding him to the e-mail thread as a participant.

In another embodiment, Bill sends a prompt to both Teresa 218 and Faye 222 seeking their permission to indicate to participants of the e-mail thread that either Teresa 218 or Faye 222 is adding Bill to the thread. Teresa fails to respond to Bill's prompt, but Faye 222 uses an e-mail client on her smartphone to send feedback to Bill granting Bill her permission. Bill's computer then sends a notification indicating, to the participants of the e-mail thread that Faye 222 is adding Bill to the thread as a participant.

In an additional embodiment, when Teresa 218 adds Bill to an e-mail thread as a BCC recipient, Teresa 218 indicates, using an e-mail client, that she does not grant permission for a notification to be sent to participants of the thread indicating that she added Bill to the thread as a participant. Teresa 218 might check a box displayed by her e-mail client, for example, when she is drafting an e-mail to which she adds Bill as a BCC recipient. When Faye 222 drafts a subsequent e-mail to which she also adds Bill as a BCC recipient, Faye 222 does not check the box reserving permission. In doing so, Faye 222 implicitly grants permission for her name to be used when a notification is sent out indicating that Bill is being added as a participant to the e-mail thread. When the e-mail server 208 detects that Bill is sending a reply e-mail, the server 208 sends a notification to participants of the e-mail thread indicating that Faye 222 rather than Teresa 218 is adding Bill to the thread.

Figure 13:
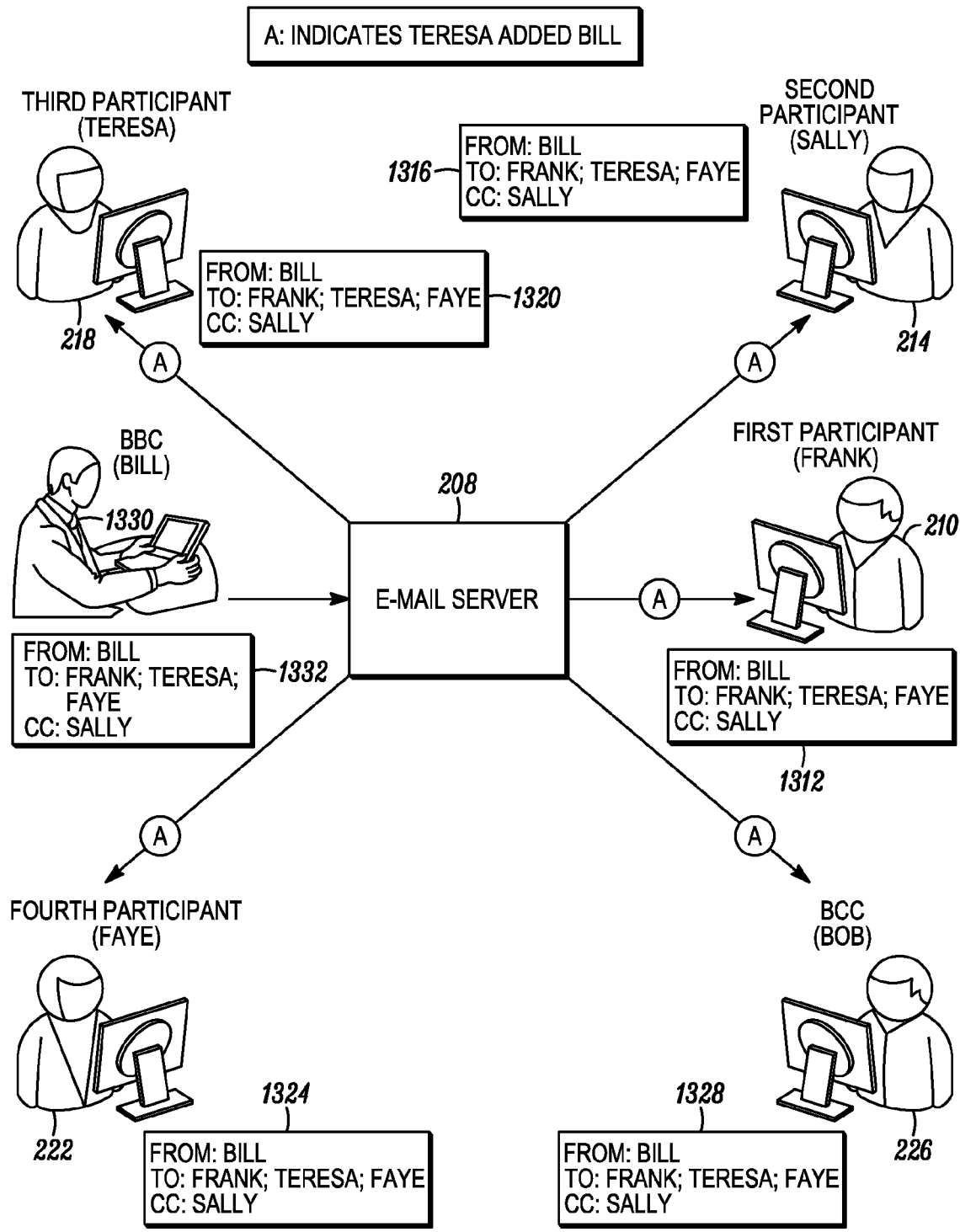
FIG. 13 illustrates an e-mail server managing an addition of a blind-carbon-copy e-mail account to an e-mail thread.

FIG. 13 shows Frank 210, Teresa 218, and Faye 222 as ordinary participants on an e-mail thread for which the e-mail server 208 is receiving and delivering e-mails of the thread. Sally 214 is a CC participant, and Bob 226 and Bill 1330 are both BCC recipients on the e-mail thread. Bob 226 was added as a BCC recipient to the e-mail thread by Frank 210, and Bill 1330 was added as a BCC recipient to the thread by both Teresa 218 and Faye 222. In the embodiment shown, Bill 1330 sends a reply e-mail having a header 1332 to participants 210, 214, 218, 222 of the e-mail thread in which Teresa 218 is indicated as the participant who added Bill 1330 to the thread as a participant. Bob 226 remains a BCC recipient on the e-mail thread and receives Bill's reply e-mail without Bill's knowledge. The headers of Bill's reply e-mail as received by Frank 210, Sally 214, Teresa 219, Fay 222, and Bob 226 are indicated at 1312, 1316, 1320, 1324, and 1328, respectively.

For one embodiment, upon detecting that a BCC recipient is sending a reply e-mail to participants of an e-mail thread, an electronic device determines that both a first and a second BCC recipient adder added the BCC recipient to the thread. The electronic device sends a first version of the reply e-mail to the first BCC recipient adder indicating that the first BCC recipient adder is adding the BCC recipient to the e-mail thread as a participant. The electronic device also sends a second version of the reply e-mail to the second BCC recipient adder indicating that the second BCC recipient adder is adding the BCC recipient to the e-mail thread as a participant. This way, neither the first nor the second BCC recipient adder learns that the other BCC recipient adder also added the BCC recipient to the e-mail thread. This embodiment is illustrated by FIG. 14.

Figure 14:
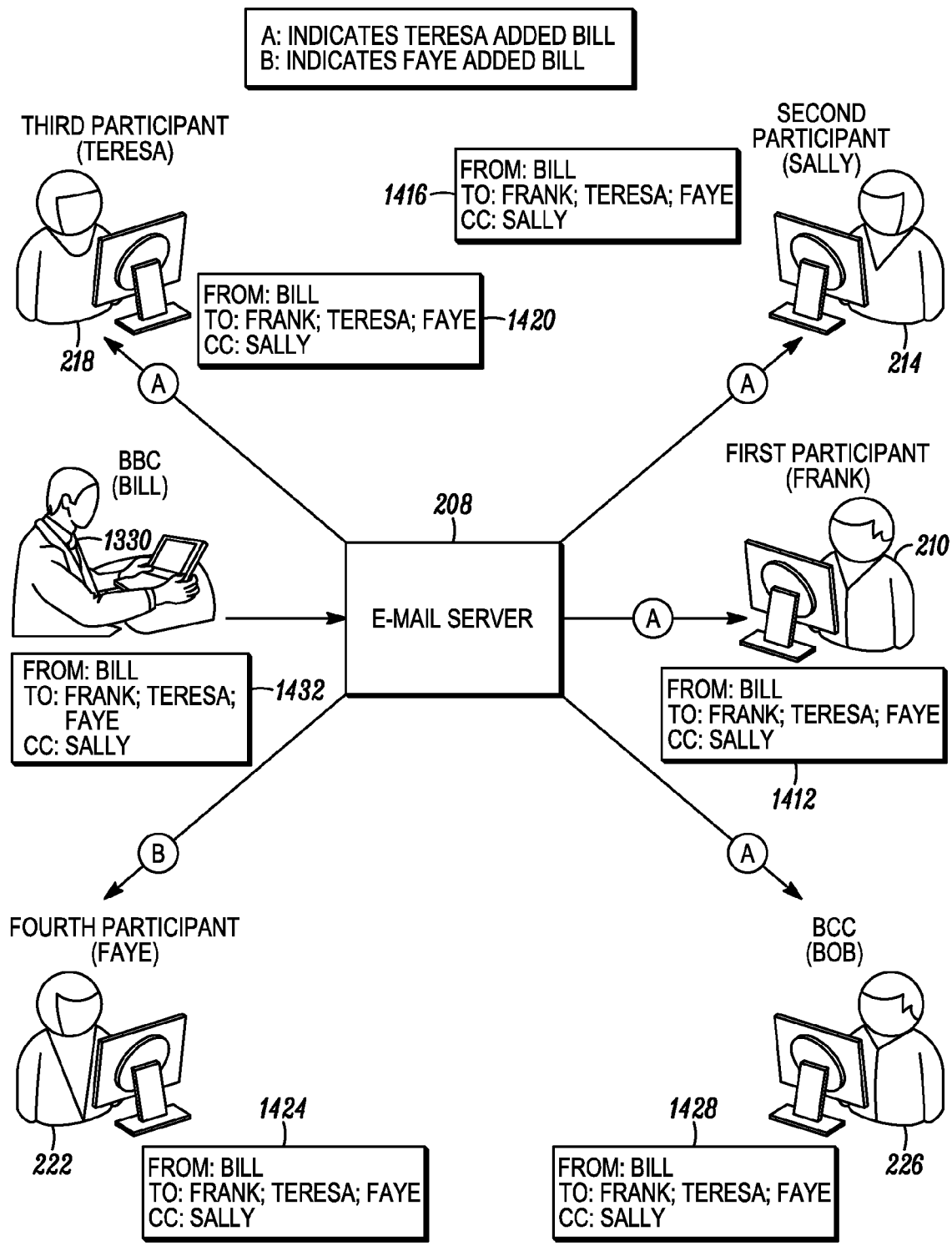
FIG. 14 illustrates an e-mail server managing an addition of a blind-carbon-copy e-mail account to an e-mail thread.

FIG. 14 shows the same participants, and also the same BCC recipients, as FIG. 13 using their e-mail accounts and the e-mail server 208 to exchange e-mails within an e-mail thread. When Bill 1330 sends his reply e-mail to the participants 210, 214, 218, 222 of the e-mail thread, Teresa 218 and Faye 222 get different versions of the e-mail. When Frank 210, Sally 214, and Teresa 218 receive Bill's reply e-mail, the e-mail indicates that Teresa 218 was the one who added Bill 1330 to the e-mail thread as a participant. For an embodiment, BCC recipient Bob 226 also receives this version of Bill's reply e-mail. The version of Bill's reply e-mail that Faye 222 receives, however, indicates that Faye 222 added Bill 1330 to the e-mail thread as a participant. After all the participants 210, 214, 218, 222 receive Bill's reply e-mail, Teresa 218 remains unaware that Faye 222 added Bill 1330 as a BCC recipient to the e-mail thread. Faye 222 also remains unaware that Teresa 218 added Bill 1330 as a BCC recipient to the e-mail thread. Headers of Bill's reply e-mail as sent by Bill and as received by Frank 210, Sally 214, Teresa 218, Faye 222, and Bob 226 are indicated at 1432, 1412, 1416, 1420, 1424, and 1428, respectively.

For one embodiment, when a BCC recipient hits "reply all" to compose a reply e-mail in response to a received e-mail, the electronic device automatically rearranges a first order of appearance of participants' names in a header of the received e-mail to a second order of appearance of the participants' names in a header of the reply e-mail. This gives the appearance to the participants of the e-mail thread that the BCC recipient was forwarded the received e-mail and that the BCC recipient manually entered the participants' names for the reply e-mail.

Figure 15:
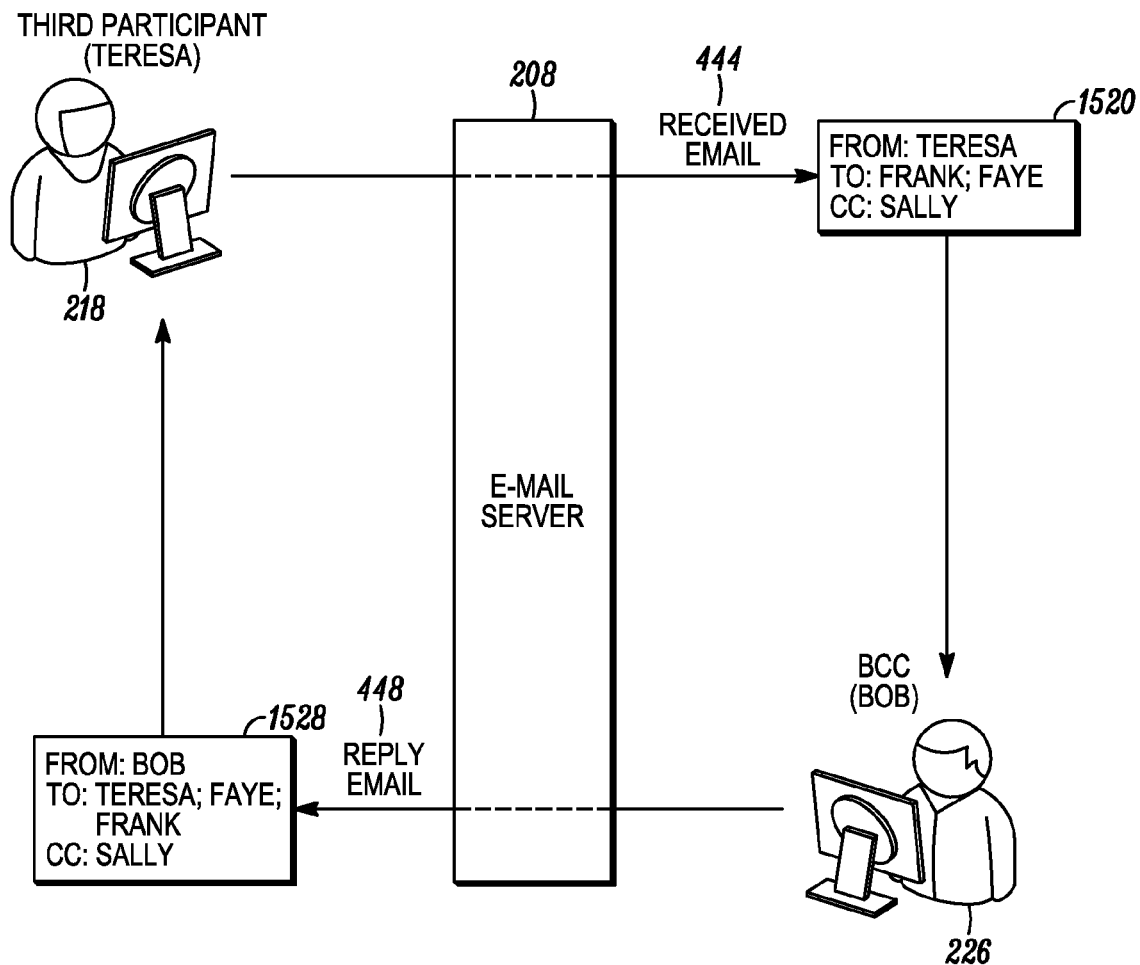
FIG. 15 illustrates an e-mail server rearranging an order of appearance of e-mail accounts in an e-mail header.

FIG. 15 shows Bob 226 receiving the e-mail 444 of the e-mail thread 400 from Teresa 218 as a BCC recipient. A header 1520 shows an order "Frank 210, Faye 222" in which participants' accounts appear in the "to" field of the received e-mail 444. In Bob's reply e-mail 448, the e-mail server 208 automatically populates or rearranges the "to" field in a header 1528 of the reply e-mail 448 to reflect the order "Teresa 218, Faye 222, Frank 210." In an alternate embodiment, an electronic client device Bob 226 uses to send the reply e-mail 448 rearranges of the order of the participants' accounts. The order in which Frank's account and Faye's account appear in the two arrangements is different. This functionality of the e-mail server 208 or Bob's electronic device of rearranging the order in which accounts appear in the "to" field of the header 1528 of the reply e-mail 448 is implemented to lead Teresa 218 to believe that Bob 226 entered her account and Frank's account manually.

In a particular embodiment, a BCC recipient account is removed from an e-mail thread when an e-mail account that added BCC recipient account is removed from the e-mail thread. If the BCC recipient account was added to the e-mail thread by multiple BCC adders, then the BCC recipient account is removed from the e-mail thread when the last of the multiple BCC adders is removed from the e-mail thread.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The taws "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method performed by an electronic computing device for managing blind-carbon-copy account replies in e-mail communications, the method comprising:
   detecting that a first e-mail account that is a first blind-carbon-copy recipient on an e-mail thread is sending a first reply e-mail, to a first received e-mail of the email thread, to at least a first participant of a set of participants of the e-mail thread;
   determining, from the set of participants of the e-mail thread, a first e-mail account adder that added the first e-mail account to the e-mail thread as the first blind-carbon-copy recipient; and
   adding first text to the first reply e-mail indicating the first e-mail account adder forwarded the first received e-mail to the first e-mail account.

2. The method of claim 1 further comprising:
   rearranging a first order of appearance of the at least a first participant in a header of the first received e-mail to a second order of appearance in a header of the first reply e-mail.

3. The method of claim 1, wherein determining the first e-mail account adder comprises:
   determining a sending account of a prior e-mail of the e-mail thread to which the first e-mail account was added as the first blind-carbon-copy recipient.

4. The method of claim 1, wherein determining the first e-mail account adder comprises:
   sending a query to an e-mail server; and
   receiving a response to the query from the e-mail server, wherein the response indicates the first e-mail account adder.

5. The method of claim 4, wherein the e-mail server determines the first e-mail account adder from a structured data record.

6. The method of claim 1 further comprising:
   detecting that a second e-mail account that is a second blind-carbon-copy recipient on the e-mail thread is sending a second reply e-mail, to a second received e-mail of the email thread, to at least a second participant of the set of participants of the e-mail thread;
   determining, from the set of participants of the e-mail thread, a second e-mail account adder that added the second e-mail account to the e-mail thread as the second blind-carbon-copy recipient; and
   adding second text to the second reply e-mail indicating the second e-mail account adder forwarded the second received e-mail to the second e-mail account.

7. The method of claim 1 further comprising:
   determining, from the set of participants of the e-mail thread, a second e-mail account adder that also added the first e-mail account to the e-mail thread as the first blind-carbon-copy recipient;
   sending a first version of the first reply e-mail to the first e-mail account adder indicating the first e-mail account adder forwarded the first received e-mail to the first e-mail account; and
   sending a second version of the first reply e-mail to the second e-mail account adder indicating the second e-mail account adder forwarded the first received e-mail to the first e-mail account.

8. The method of claim 1 further comprising:
   determining, from the set of participants of the e-mail thread, a second e-mail account adder that also added the first e-mail account to the e-mail thread as the first blind-carbon-copy recipient; and
   selecting the first e-mail account adder over the second e-mail account adder when adding the first text to the first reply e-mail.

9. The method of claim 8, wherein selecting the first e-mail account adder over the second e-mail account adder comprises at least one of:
   determining that the first e-mail account adder added the first e-mail account to the e-mail thread before the second e-mail account adder added the first e-mail account to the e-mail thread;
   prompting the first e-mail account for feedback, and receiving the feedback from the first e-mail account, wherein selecting the first e-mail account adder over the second e-mail account adder is based on the feedback; or
   prompting at least one of the first e-mail account adder or the second e-mail account adder for feedback, and receiving the feedback from the at least one of the first e-mail account adder or the second e-mail account adder, wherein selecting the first e-mail account adder over the second e-mail account adder is based on the feedback.

10. A method performed by an electronic computing device for managing blind-carbon-copy account replies in e-mail communications, the method comprising:
    detecting that a blind-carbon-copy recipient account of a received e-mail of an e-mail thread is replying to at least one participant of a set of participants of the e-mail thread;
    sending an auto-generated e-mail to the at least one participant of the set of participants indicating the blind-carbon-copy recipient account is being added to the e-mail thread as a non-blind-carbon-copy recipient account; and
    sending a reply e-mail from the non-blind-carbon-copy recipient account to the at least one participant of the set of participants after sending the auto-generated e-mail.

11. The method of claim 10, wherein detecting that the blind-carbon-copy recipient account is replying to at least one participant of the set of participants of the e-mail thread comprises:
    detecting that the blind-carbon-copy recipient account is replying to all participants of the set of participants of the e-mail thread;
    adding the blind-carbon-copy recipient account to appear as a participant of the e-mail thread in e-mails of the e-mail thread sent after the auto-generated e-mail; and
    removing blind-carbon-copy properties of the blind-carbon-copy recipient account from the e-mail thread.

12. The method of claim 10 further comprising:
    determining, from the set of participants of the e-mail thread, a blind-carbon-copy recipient account adder for the blind-carbon-copy recipient account, wherein the auto-generated e-mail indicates the blind-carbon-copy recipient account adder is adding the blind-carbon-copy recipient account to the e-mail thread.

13. The method of claim 12, wherein determining the blind-carbon-copy recipient account adder comprises:
sending a query to an e-mail server; and
receiving a response to the query from the e-mail server, wherein the response indicates the blind-carbon-copy recipient account adder.

14. The method of claim 10 further comprising:
determining a time delay period; and
delaying sending the reply e-mail for the time delay period.

15. The method of claim 14, wherein the time delay period is determined based on at least one of:
a length of the received e-mail; or
content of the received e-mail.

16. An electronic computing device configured to manage blind-carbon-copy account replies in e-mail communications, the electronic computing device comprising:
at least one communication interface configured to receive and send e-mail communications; and
a processing element operatively coupled to the at least one communication interface, wherein the processing element is configured to:
detect that an e-mail account that is a blind-carbon-copy recipient of a received e-mail of an e-mail thread is sending a reply e-mail to at least one participant of a set of participants of the e-mail thread;
determine, from the set of participants of the e-mail thread, an e-mail account adder that added the e-mail account to the e-mail thread as the blind-carbon-copy recipient; and
send a notification to the at least one participant of the set of participants of the e-mail thread that indicates the e-mail account adder is adding the e-mail account to the e-mail thread as a non-blind-carbon-copy recipient account by the blind-carbon-copy adder.

17. The electronic computing device of claim 16, wherein the processing element is configured to add the notification to the reply e-mail to indicate the e-mail account adder forwarded the received e-mail to the e-mail account.

18. The electronic computing device of claim 16, wherein the processing element is configured to send the notification as an auto-generated e-mail prior to sending the reply e-mail.

19. The electronic computing device of claim 18, wherein the processing element is further configured to:
determine a time delay period; and
delay sending the reply e-mail for the time delay period.

20. The method of claim 16, wherein the electronic computing device is configured as one of:
an e-mail client device; or
an e-mail server device.

* * * * *